(12) United States Patent
Oliver

(10) Patent No.: US 8,392,993 B1
(45) Date of Patent: Mar. 5, 2013

(54) SYSTEMS AND METHODS FOR DELAYING TERMINATION OF A PROCESS TO CAPTURE DATA RELATING TO A POTENTIAL THREAT

(75) Inventor: Ian Oliver, Manly Vale (AU)

(73) Assignee: Symantec Corporation, Mountain View, CA (US)

( * ) Notice: Subject to any disclaimer, the term of this patent is extended or adjusted under 35 U.S.C. 154(b) by 258 days.

(21) Appl. No.: 12/822,082

(22) Filed: Jun. 23, 2010

(51) Int. Cl.
*H04L 9/00* (2006.01)
(52) U.S. Cl. .......................................................... 726/23
(58) Field of Classification Search .................... 726/24
See application file for complete search history.

(56) References Cited

U.S. PATENT DOCUMENTS

| | | |
|---|---|---|
| 2006/0179484 A1* | 8/2006 | Scrimsher et al. ............... 726/23 |
| 2006/0294590 A1* | 12/2006 | Enstone et al. .................. 726/24 |
| 2008/0120611 A1* | 5/2008 | Aaron ........................... 717/174 |
| 2010/0077476 A1* | 3/2010 | Adams ............................ 726/22 |

* cited by examiner

*Primary Examiner* — Matthew Smithers
(74) *Attorney, Agent, or Firm* — Holland & Hart LLP

(57) ABSTRACT

A computer-implemented method for delaying termination of a process to capture data relating to a potential threat is described. A process that executes an event that indicates a threat is monitored. The event is allowed to execute on the process until a predetermined indicator is triggered. Data associated with the execution of the event is recorded when the predetermined indicator is triggered. The recorded data is transmitted to a processing system for analysis. The process is terminated from continuing to execute the event.

20 Claims, 10 Drawing Sheets

SYSTEMS AND METHODS FOR DELAYING TERMINATION OF A PROCESS TO CAPTURE DATA RELATING TO A POTENTIAL THREAT

BACKGROUND

The use of computer systems and computer-related technologies continues to increase at a rapid pace. This increased use of computer systems has influenced the advances made to computer-related technologies. Indeed, computer systems have increasingly become an integral part of the business world and the activities of individual consumers. Computer systems may be used to carry out several business, industry, and academic endeavors. The wide-spread use of computers has been accelerated by the increased use of computer networks, including the Internet.

Many businesses use one or more computer networks to communicate and share data between the various computers connected to the networks. The productivity and efficiency of employees often requires human and computer interaction. Users of computer technologies continue to demand that the efficiency of these technologies increase. Improving the efficiency of computer technologies is desirable to anyone that uses and relies on computers.

Malware may be installed or executed on computers in order to hinder the functionalities of computers. Malware may also be used to allow an authorized user to gain control of a computer as well as access to data stored on the computer. This data may be sensitive data to the user of the computer (i.e., passwords, account numbers, financial information, and the like). Detection programs may attempt to prevent malware from being installed on a computer. Developers of malware (and other threats to computers), however, are aware of programs designed to block the installation and execution of malware. As a result, developers of malware may design the malware to not be accessible each time a computer attempts to access the malware (for analysis purposes). In other words, the malware may not be accessible when a backend device attempts to perform an analysis of the malware. Accordingly, benefits may be realized by providing improved systems and methods for detecting malware and other threats to a computing device. In particular, benefits may be realized by providing systems and methods for delaying termination of a process to capture data relating to a potential threat.

SUMMARY

According to at least one embodiment, a computer-implemented method for delaying termination of a process to capture data relating to a potential threat is described. A process that executes an event that indicates a threat is monitored. The event is allowed to execute on the process until a predetermined indicator is triggered. Data associated with the execution of the event is recorded when the predetermined indicator is triggered. The recorded data is transmitted to a processing system for analysis. The process is terminated from continuing to execute the event.

In one embodiment, the event includes accessing an exploit uniform resource locator (URL) that includes a download URL. The download URL may be configured to download a file. The event may also include accessing a message box that comprises a message requesting confirming input from a user.

In one example, an information requesting URL may be accessed upon receiving the confirming input from the user. The information requesting URL may be configured to download an information requesting form. In one configuration, a pattern of data that is input to the information requesting form may be analyzed. The process may be terminated from continuing to execute the event if the patter of data matches a predetermined pattern of data.

The process may be terminated when a file is downloaded. The process may also be terminated if a call to a predetermined application programming interface (API) call is executed. The process may further be terminate if a call to a predetermined API call sequence is executed.

A computing device configured to delay termination of a process to capture data relating to a potential threat is also described. The device may comprise a processor and memory in electronic communication with the processor. The device may include a monitoring module configured to monitor a process that executes an event that indicates a threat, and allow the event to execute on the process until a predetermined indicator is triggered. The monitoring module may also be configured to record data associated with the execution of the event when the predetermined indicator is triggered, and terminate the process from continuing to execute the event. The device may further include a reporting module configured to transmit the recorded data to a processing system for analysis.

A computer-program product for delaying termination of a process to capture data relating to a potential threat is also described. The computer-program product may include a computer-readable medium having instructions thereon. The instructions may include code programmed to monitor a process that executes an event that indicates a threat, and code programmed to allow the event to execute on the process until a predetermined indicator is triggered. The instructions may also include code programmed to record data associated with the execution of the event when the predetermined indicator is triggered, and code programmed to transmit the recorded data to a processing system for analysis. The instructions may further include code programmed to terminate the process from continuing to execute the event.

Features from any of the above-mentioned embodiments may be used in combination with one another in accordance with the general principles described herein. These and other embodiments, features, and advantages will be more fully understood upon reading the following detailed description in conjunction with the accompanying drawings and claims.

BRIEF DESCRIPTION OF THE DRAWINGS

The accompanying drawings illustrate a number of exemplary embodiments and are a part of the specification. Together with the following description, these drawings demonstrate and explain various principles of the instant disclosure.

Figure 1:
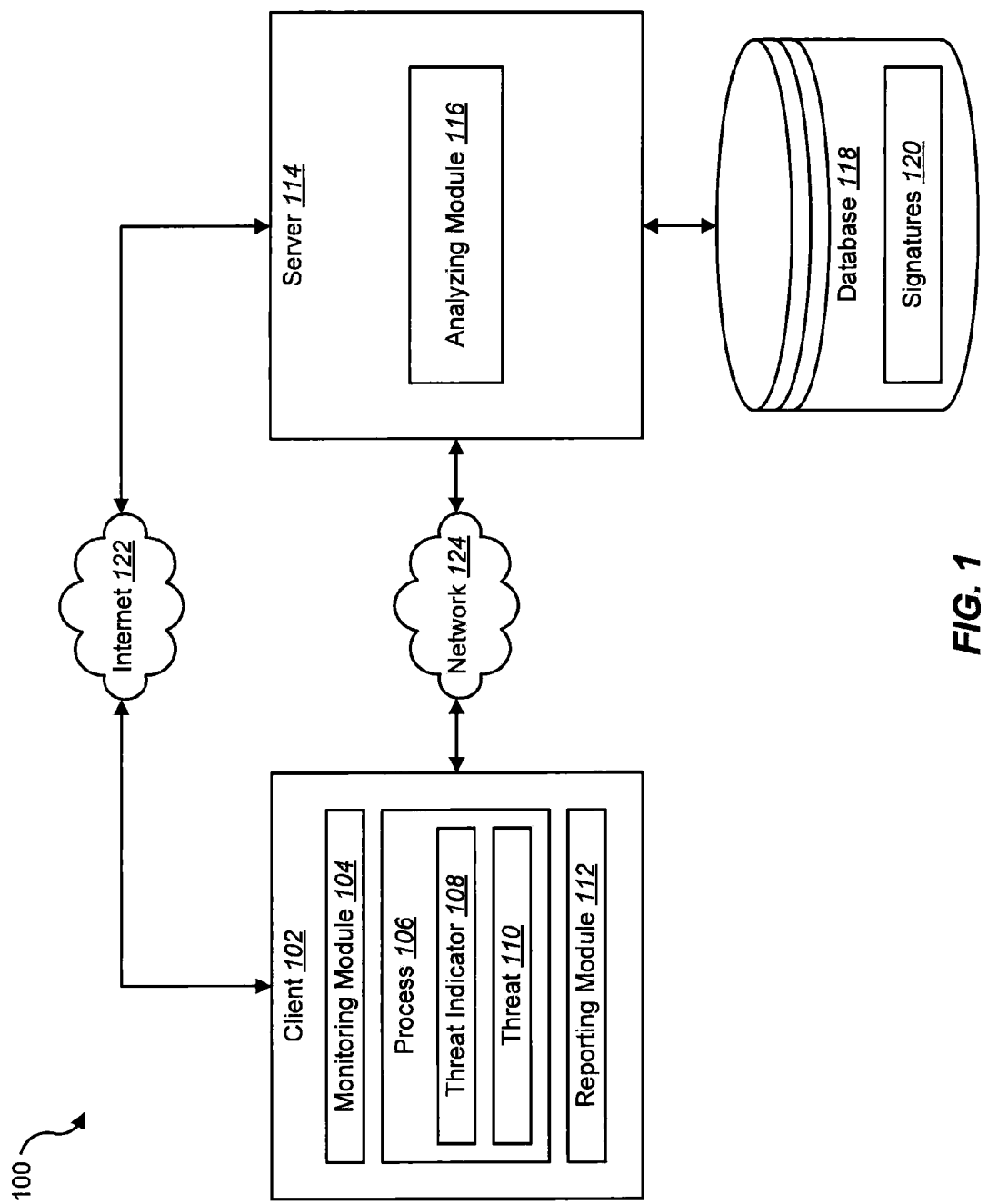
FIG. 1 is a block diagram illustrating one embodiment of an environment in which the present systems methods may be implemented.

While the embodiments described herein are susceptible to various modifications and alternative forms, specific embodiments have been shown by way of example in the drawings and will be described in detail herein. However, the exemplary embodiments described herein are not intended to be limited to the particular forms disclosed. Rather, the instant disclosure covers all modifications, equivalents, and alternatives falling within the scope of the appended claims.

DETAILED DESCRIPTION OF EXEMPLARY EMBODIMENTS

Computing devices may be constantly monitored for threats against the integrity of the device. A threat may be the danger of an attack on the computing device. A threat may include, without limitation, an exploit, social engineering, malware, virus, and the like. These programs may attempt to harvest data stored on a device. An example of a program that may attack a computing device may be an exploit. In one configuration, an exploit may be a piece of software, a piece of data, or a sequence of commands that may take advantage of a vulnerability of a computing device in order to cause unintended or unanticipated behavior to occur on the software or hardware of the device. This may include such things as gaining control of the computing device, allowing privilege escalation, denying services, buffer overflow, directory climbing, defaults, denial of service, and the like.

Programs that may attack a computing device may use social engineering to carry out the attack. Social engineering may refer to the act of a program manipulating users into performing actions or divulging confidential information, rather than the program breaking into the device or using technical hacking techniques. Social engineering may refer to an act of deception for the purpose of information gathering, fraud, computer system access, and the like.

There may be many ways to obtain technical or administrative information about a computing device. For example, the information may be obtained from the devices and systems themselves. In addition, the information may be obtained from the administrators and users of the devices. Surreptitious or unauthorized attempts to obtain such system information may be known as hacking or cracking if the attempt involves obtaining the information from the devices and as social engineering if they involve manipulating or 'tricking' a person into divulging the information. The term social engineering may describe the 'tricks' used by mass mailing viruses to entice recipients messages with viral attachments to run (or 'view') those attachments.

Exploits and social engineering programs may cause a harmful file or other executable to be downloaded to the computing device. This file may then execute and damage the computing device by collecting sensitive data, destroying software and/or hardware of the device, causing the device to malfunction, and the like.

When a possible exploit or social engineering threat is detected, the code or scripts executing at the time on the computing device may be blocked and prevented from continuing to execute. Terminating the execution of the code or scripts may be done in order to prevent the harmful file from being accessed (via a download uniform resource location (URL)) and the prevent the file from actually being downloaded to the computing device. Preventing the code and scripts from continuing to execute, however, may result in losing the opportunity to capture the download URL and the harmful file for analysis.

In one embodiment, when a possible exploit or social engineering threat is detected, the present systems and methods may continue to allow the code and scripts running at the time of the detection to continue to execute. This may allow the download URL and the harmful file to be captured. After the download URL and file have been captured, the present system and methods may then terminate the process and prevent the file from actually executing on the device.

The captured download URL and the captured harmful file may then be analyzed in order to determine the damage the file would have caused and how the file would have caused such damage to the device. This analysis may then be used to improve security features and detection mechanisms on the computing device.

Present security features on computing devices do not collect files insitu from user machines when a threat is detected by allowing code and scripts to continue executing after the detection of the threat. Instead, present security features terminate the code and scripts and attempt to capture the files by use of a backend honey client. Developers of exploits and social engineering threats are aware of this current process and may prevent a download URL or harmful file from being accessed if the threat is terminated. In other words, the backend honey client may not be able to recreate the download URL in order to access the harmful file is the code and scripts are terminated on the user machine when the threat is detected. By allowing the code and scripts to continue executing on the computing device after the threat is detected, a collection of harmful files across of multiplicity of clients all running an adaptor in accordance with the present systems and methods may be captured. The download URLs may be recorded and the security features of computing devices may be improved.

FIG. 1 is a block diagram illustrating one embodiment of an environment 100 in which the present systems methods may be implemented. In one configuration, a client computing device 102 may communicate with a server 114 across a network connection 124. The client 102 may be a personal computer (PC), a laptop, a personal digital assistant (PDA), a mobile communications device, or any other type of computing device.

In one embodiment, the client 102 may include a monitoring module 104. The monitoring module 104 may monitor a process 106 that may be executing on the client 102. The monitoring module 104 may monitor the process 106 in order to detect a threat indicator 108 that may execute within the process 106. The threat indicator 108 may be associated with an actual threat 110. For example, the process 106 may be a web browser application. The threat indicator 108 may be a specific URL that is accessed by the process 106. If the process 106 is allowed to continue to execute after the threat indicator 108 is detected, the actual threat 110 may execute on the process 106. The threat 110 may cause the client 102 to malfunction. In addition, the threat 110 may cause data stored on the client 102 to be lost or corrupted. The threat 110 may also allow a third party to take control of the client 102, and the like. When the monitoring module 104 detects the threat indicator 108, a reporting module 112 may transmit data or information regarding the threat indicator 108 to the server 114 for analysis. In one embodiment, the threat indicator 108 may be allowed to continue to execute in order for the monitoring module 104 to be able to capture the threat 110 (or information regarding the threat 110).

In one embodiment, the server 114 may include an analyzing module 116. The analyzing module 116 may analyze the data or information received from the reporting module 112. In one configuration, a database 118 may store known signatures 120 associated with various threat indicators and actual threats. For example, the signatures 120 may be signatures of known malware, known threats, known viruses, and the like. The analyzing module 116 may compare a signature associated with the threat indicator 108 and/or the threat 110 to the signatures 120 stored in the database 118. The analyzing module 116 may provide a summary of the analysis of the threat indicator 108 and/or the threat 110 to the client 102.

In one configuration, the client 102 and the server 114 may access the Internet 122. The devices 102, 114 may access the Internet 122 in order to access a website identified by a particular URL. For example, the process 106 may access the Internet 122 in order to display a website to a user of the client 102. The server 114 may also access the Internet 122 in order to access the threat indicator 108 and the threat 110, which may be identified by a URL.

Figure 2:
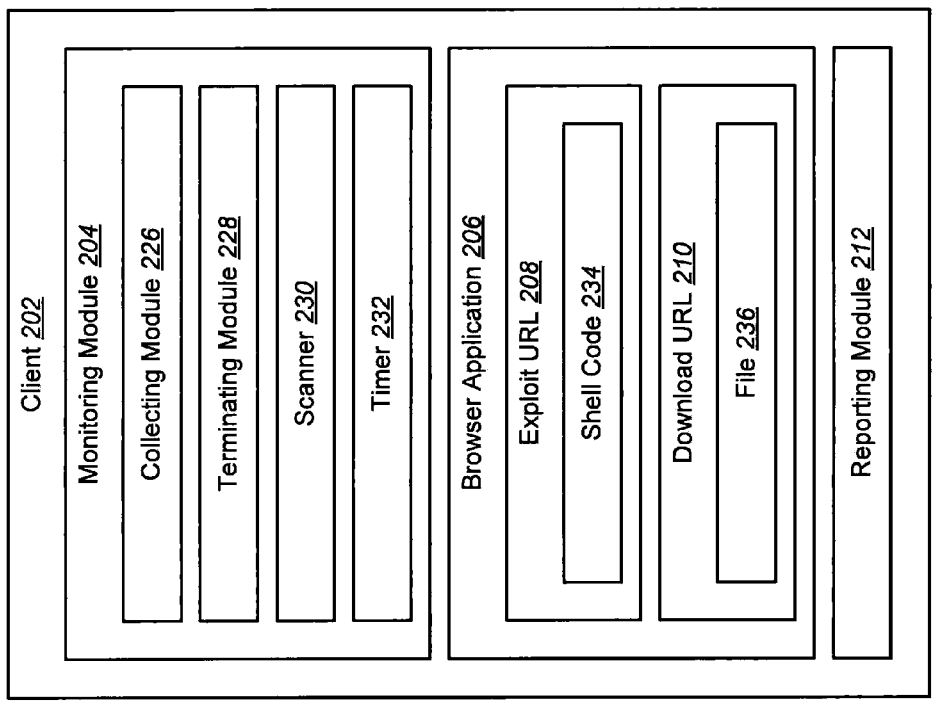
FIG. 2 is a block diagram illustrating a further embodiment of a client computing device.

FIG. 2 is a block diagram illustrating a further embodiment of a client computing device 202. The client 202 includes a monitoring module 204, a browser application 206, and a reporting module 212.

In one example, the monitoring module 204 may monitor data accessed by the browser application 206. A collecting module 226 may collect the data accessed by the browser 206. In one example, the browser application 206 may be a web browser, and may access an exploit URL that may represent a potential threat to the client 202. The exploit URL 208 may be flagged or identified by the monitoring module 204 as a potential threat to the client 202. In one embodiment, the exploit URL 208 may include shell code 234. The shell code 234 may access a download URL 210. The download URL 210, when accessed, may download a file 236. The file 236 may represent the actual threat to the client 202.

In one example, if the monitoring module 204 detects a potential threat from the exploit URL 208, the shell code 234 may be allowed to continue to execute and access the download URL 210, which may begin to cause the file 236 to be downloaded to the client 202. A terminating module 228 may determine when to terminate or stop the shell code 234 from executing. For example, the monitoring process may terminate if a download of the file 236 occurs. In addition, the terminating module 228 may terminate the monitoring process is calls to specific application programming interfaces (APIs) calls are made that may lead to undesirable system changes (i.e., CreateRemoteThread( )). Further, the monitoring process may be terminated if calls to specific APIs call sequences are made that may lead to undesirable system changes. The terminating module 228 may also terminate the monitoring process if a timer 232 expires. If the user attempts to navigate away from the context of the threat, the monitoring process may be terminated. For example, if the user attempts to navigate away from the exploit URL 208. If one or all of the events described above occur, the terminating module 228 may prevent the actual file 236 from being downloaded. In another embodiment, the terminating module 228 may allow the file 236 to be downloaded but not opened or executed. In other words, the downloaded file 236 may be saved into a quarantine and remained isolated from the client 202.

In one configuration, a scanner 230 may scan the captured exploit URL 208 and/or the download URL 210 and determine if the monitoring module 204 has previously collected or captured this information. If the exploit URL 208 and/or the download URL 210 have not been previously captured by the collecting module 226, a reporting module 212 may transmit this information to the server 114 for analysis.

Figure 3:
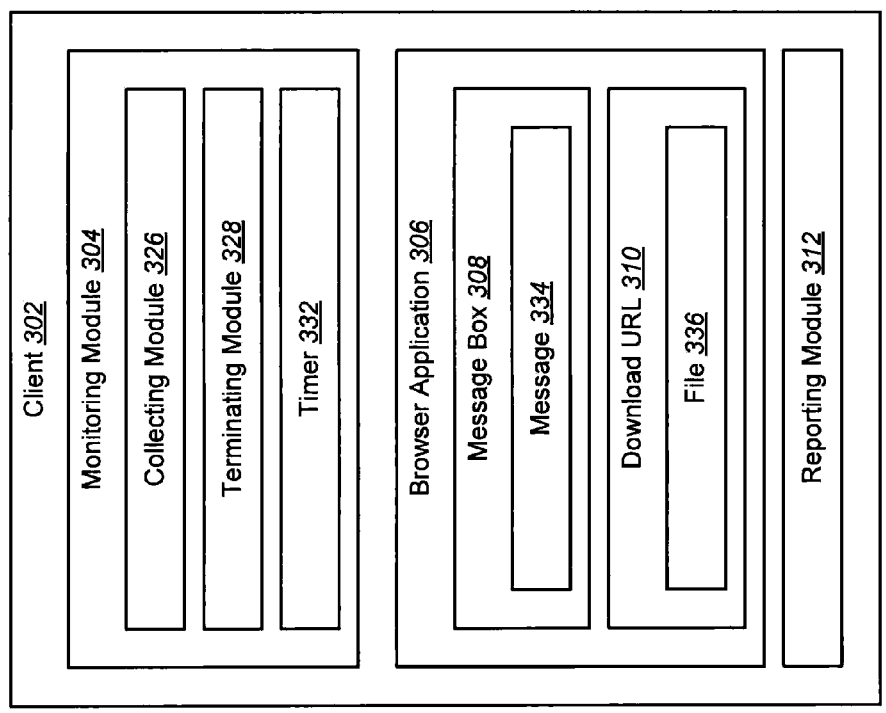
FIG. 3 is a block diagram illustrating another embodiment of a client computing device.

FIG. 3 is a block diagram illustrating another embodiment of a client computing device 302. The client 302 may include a monitoring module 304, a browser application 306, and a reporting module 312. As previously explained, the monitoring module 304 may monitor the actions and data accessed by the browser application 306. A collecting module 326 may collect information and data that may be monitored by the monitoring module 304.

In one configuration, the browser application 306 may produce a message box 308 that includes a message 334 to a user. The message 334 may instruct the user to click a particular button to confirm or request a particular action. In one example, the message box 308 and the message 334 may be a deceiving message intended to corrupt the client 302 when the user performs the confirming or requesting action by clicking a button in the message 334. For example, the user may click a button within the message 334 and this may cause a download URL 310 to be accessed. The download URL 310 may then be used to download a malicious file 336. The monitoring module 304 may detect when the user performs an action within the message 334 (e.g., clicking a button). When the user performs the action, the collecting module 326 may collect or capture the download URL 310 and/or the file 336 that are subsequently accessed. A terminating module 328 may prevent the file 336 from actually downloading to the client 302. The terminating module 328 may also wait until the file 336 has been downloaded to the client 302 and then prevent the file 336 from executing on the client 302.

The reporting module 312 may report the data and information collected by the collecting module 326 to a backend device, such as a server 114. The server may then analyze the data and information received from the reporting module 312. In one configuration, the collecting module 326 may collect or capture the actual download URL 310. In a further embodiment, the collecting module 326 may collect the file 336 downloaded from the download URL 310. The backend server 114 may analyze the download URL 310 and/or the file 336 and provide a report to the client 302 regarding the analysis.

The monitoring module 304 may further include a timer 332 that expires after a certain period of time if the user has not performed the confirming action requested by the message 334. The timer 332 also expire if the user performs one or all of the actions described previously. If the timer 332 expires, the terminating module 328 may prevent the user from performing the confirming action and the reporting module 312 may notify the user that a potential threat had been detected.

Figure 4:
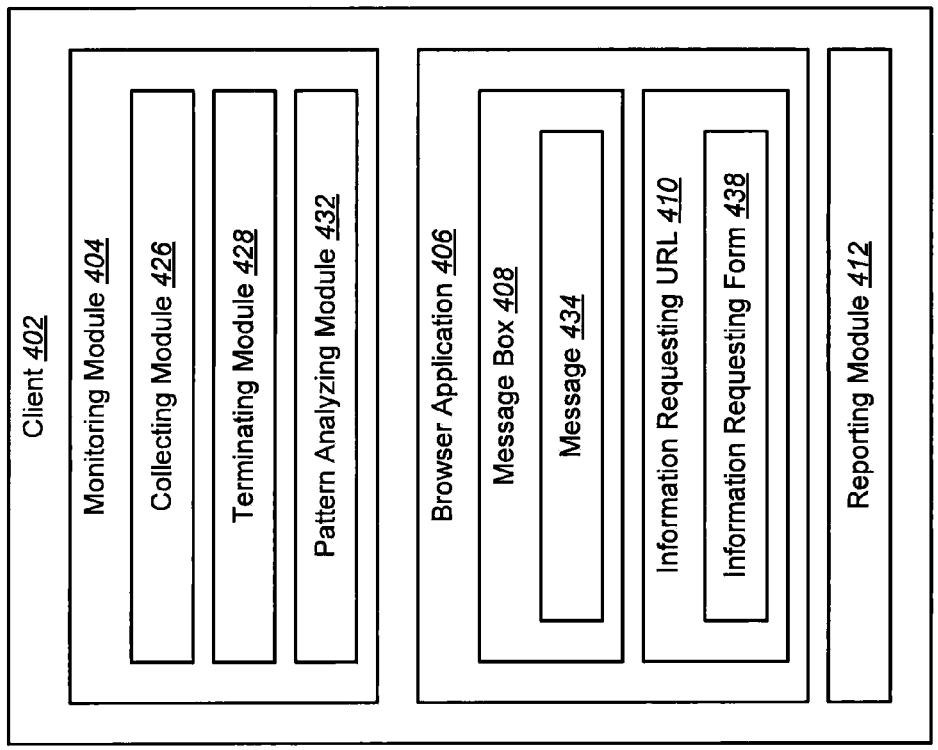
FIG. 4 is a block diagram illustrating another embodiment of a client computing device.

FIG. 4 is a block diagram illustrating another embodiment of a client computing device 402. As explained previously, the client 402 may include a monitoring module 404, a browser application 406, and a reporting module 412.

In one embodiment, the browser application 406 may be a web browser and may display a message box 408 that includes a message 434 to the user. The message 434 may request a confirming action to be performed by the user. For example, the message 434 may request the user to click a particular button or location within the message 434. If the user performs the confirming action, an information requesting URL 410 may be accessed which may provide an information requesting form 438 to the user. The form 438 may request the user to provide sensitive information, such as account information, credit card information, and the like.

The monitoring module 404 may include a pattern analyzing module 432. The pattern analyzing module 432 may analyze the type of data or information the user enters into the information requesting form 438. If the pattern analyzing module 432 determines that the information the user is providing to the information requesting form 438 is sensitive information, a terminating module 428 may terminate the process so that the user is prevented from continuing to provide information in the information requesting form 438. For example, the pattern analyzing module 432 may determine that the pattern of data the user is providing to the form 438 is similar to a credit card number. The terminating module 428 may disable the for 438 so that the user is prevented from providing the complete credit card number into the form 438. The form 438 may be disabled by preventing the form 438 from being displayed to the user, by preventing data from being stored in a field of the form 438, by causing the browser application 406 to navigate away from the information requesting URL 410, etc.

A collecting module 426 may collect or capture the information requesting URL 410 and/or the information requesting form 438 before the terminating module 428 terminates the process. The reporting module 412 may then transmit or report the captured information to a backend server 114 for analysis.

Figure 5:
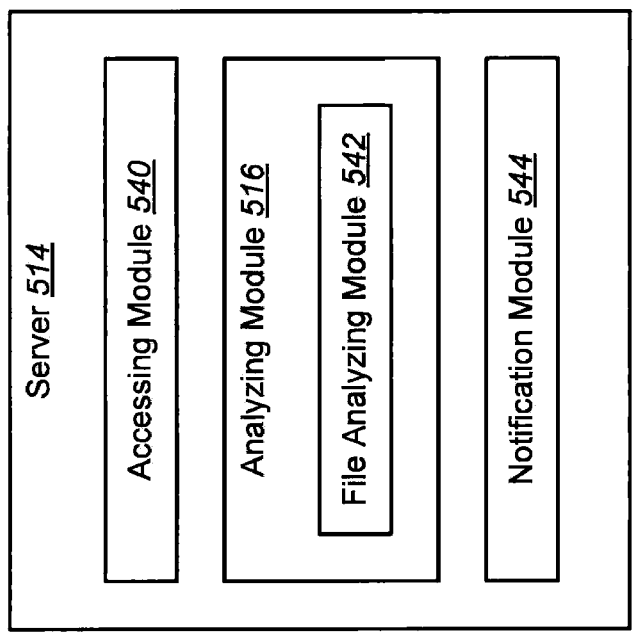
FIG. 5 is a block diagram illustrating one embodiment of a backend server.

FIG. 5 is a block diagram illustrating one embodiment of a backend server 514. The server 514 may include an accessing module 540, an analyzing module 516, and a notification module 544. In one embodiment, the server 514 may receive information collected by a collecting module 226. The information may include a threat 110, such as a download URL 210, an information requesting URL 410, and the like. The information may further include a file 236 associated with the download URL 210 or an information requesting form 438. If the file 236 and/or the information requesting form 438 is not provided by the reporting module 112, the accessing module 540 may access the download URL 210 to download the file 236 and/or the information requesting URL 410 to download the information requesting form 438.

In one embodiment, the analyzing module 516 may analyze the received (or downloaded data). The module 516 may include a file analyzing module 542 that may compare a signature associated with the file 236 and/or the information requesting form 438. The analyzed signatures may be compared with the signatures 120 stored in the database 118 that are associated with known malware, viruses, malicious files, and the like. If the analyzed signatures match one of the signatures 120 stored in the database 118, the notification module 544 may notify the client 102 that the file 236 and/or the information requesting form 438 is a malicious threat. Further, the content of the file 236 and/or information requesting form 438 may be analyzed instead of (or in addition to) their signatures. The analyzing module 516 may determine whether the file 236 and/or the form 438 are malicious based on the content analysis. If the file 236 and/or the form 438 are determined to be malicious, an identifier or signature for the file 236 and form 438 may be stored in the database 118. The notification module 544 may also provide a notification to the client 202 that the file 236 and/or form 438 have been determined to be malicious and a corresponding identifier or signature for the file 236 and form 438 has been stored in the database 118.

Figure 6:
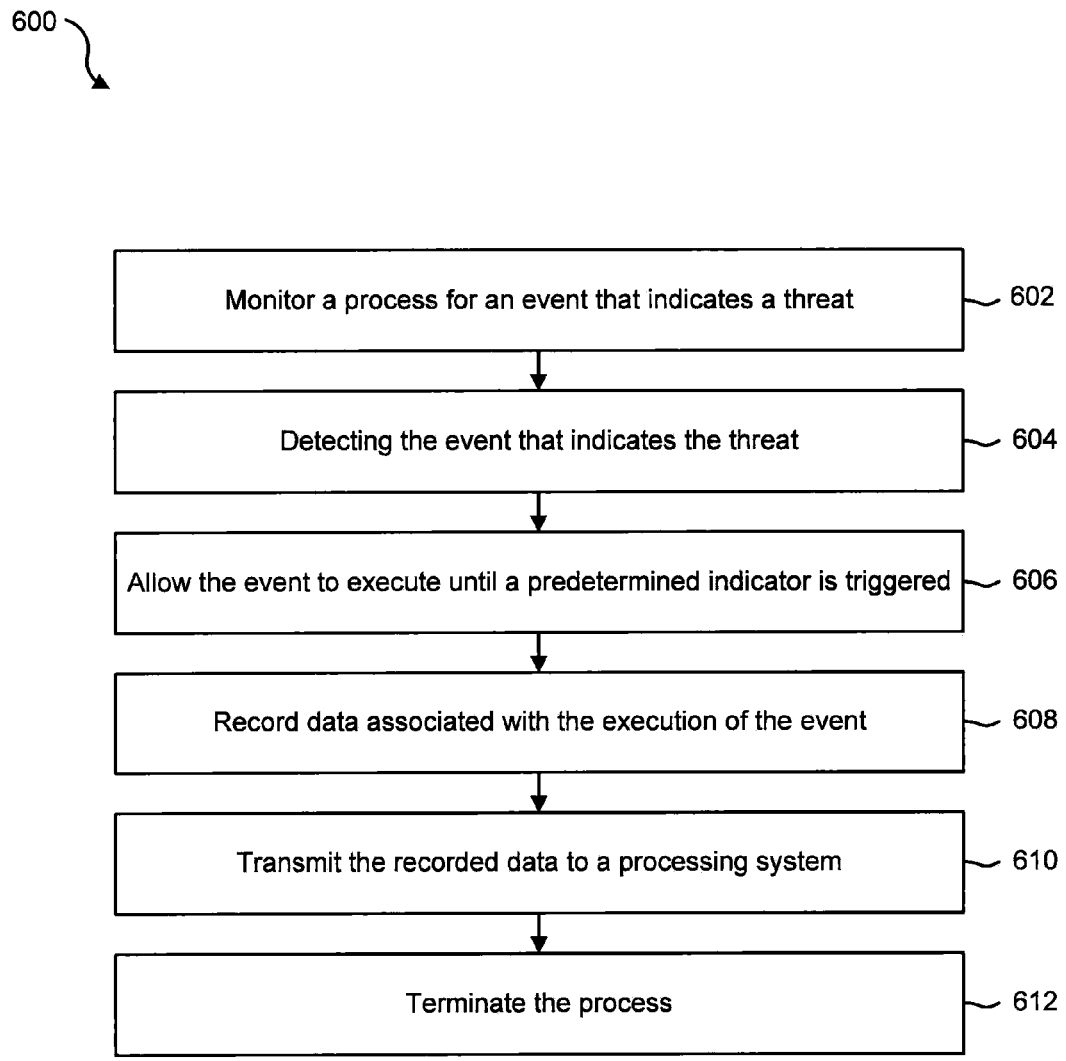
FIG. 6 is a flow diagram illustrating one embodiment of a method for delaying the termination of a potential threat in order to collect information relating to the potential threat.

FIG. 6 is a flow diagram illustrating one embodiment of a method 600 for delaying the termination of a potential threat in order to collect information relating to the potential threat. In one embodiment, the method 600 may be implemented by the monitoring module 104.

In one configuration, a process may be monitored 602 for an event that indicates the possibility of a threat. The event that indicates the possibility of the threat may be detected 604. In one configuration, the event may be allowed 606 to execute until a predetermined indicator is triggered. Data associated with the execution of the event may be recorded 608. The recorded data may be transmitted 610 to a processing system for analysis and the process may be terminated 612.

Figure 7:
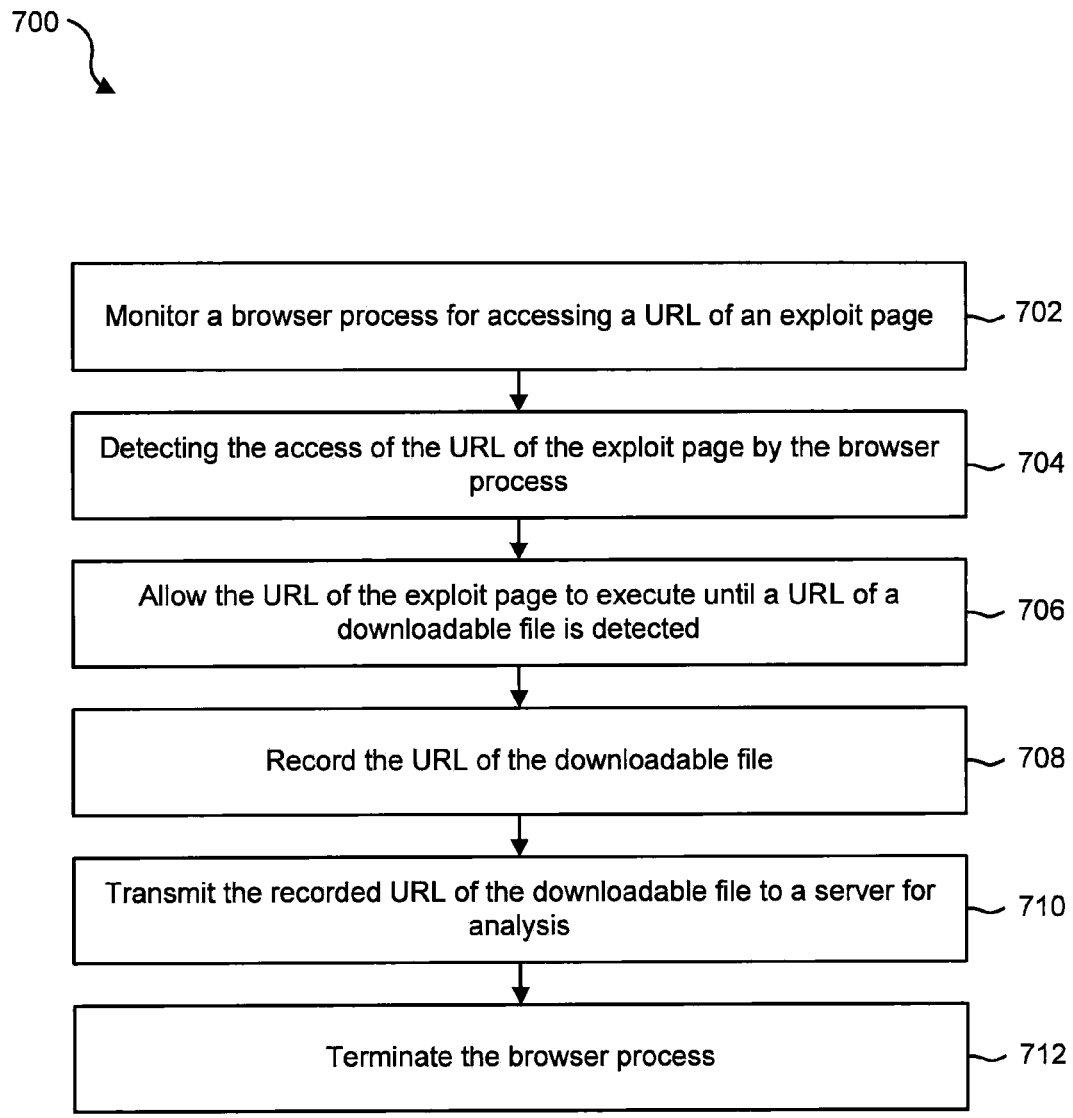
FIG. 7 is a flow diagram illustrating one embodiment of a method for delaying the termination of a process that is accessing a harmful URL.

FIG. 7 is a flow diagram illustrating one embodiment of a method 700 for delaying the termination of a process that is accessing a harmful URL. The method 700 may be implemented by the monitoring application 104.

In one example, a browser process may be monitored 702 for accessing a URL of an exploit page. Accessing the URL of the exploit page may be detected 704. The URL of the exploit page may be allowed 706 to execute until a URL of a downloadable file is detected. The URL of the downloadable file may be recorded 708, and the URL of the downloadable file may be transmitted 710 to a server for analysis. The process accessing the URL of the downloadable file may be terminated 712.

Figure 8:
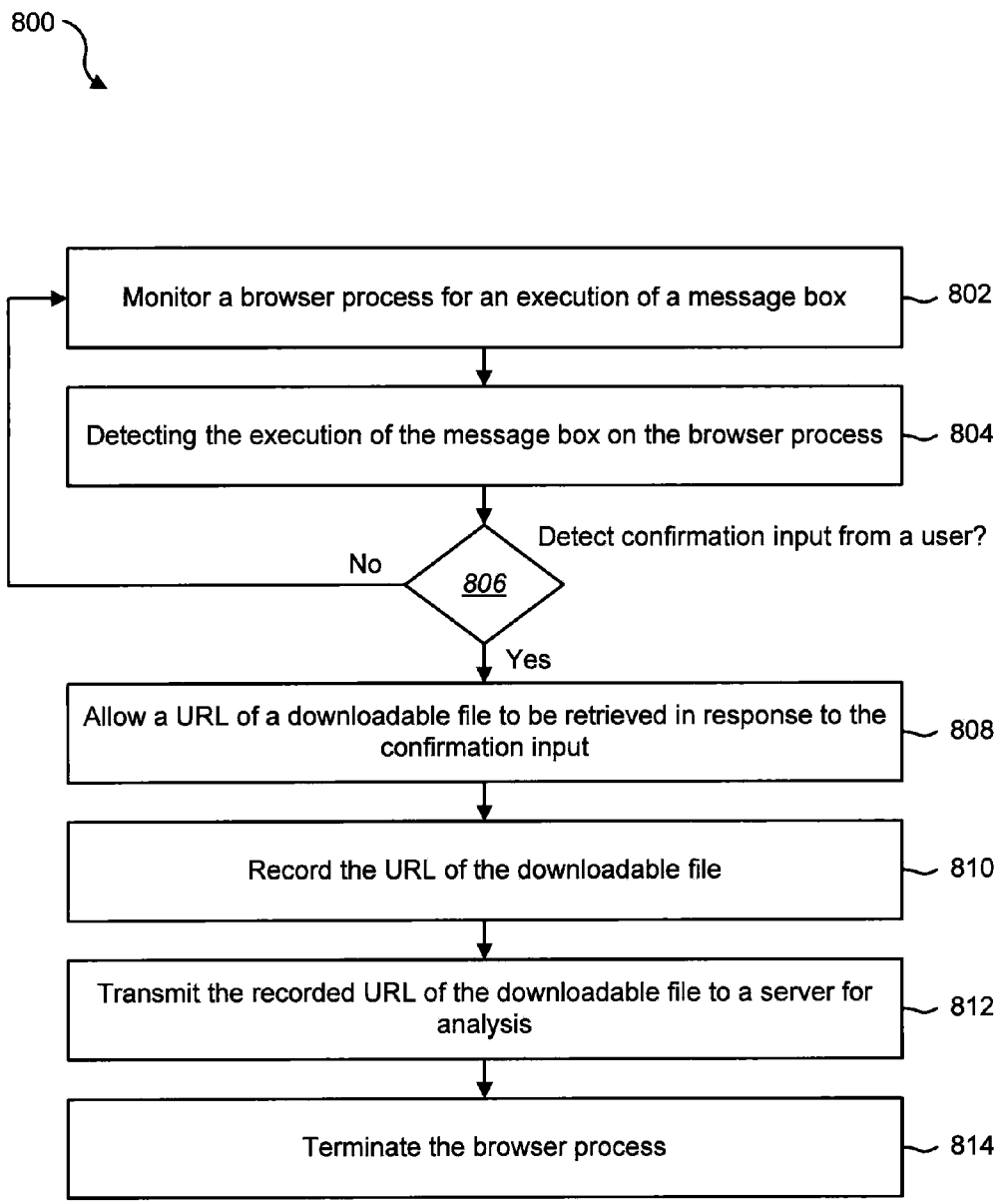
FIG. 8 is a flow diagram illustrating one embodiment of method for delaying the termination of a process requesting sensitive information from a user.

FIG. 8 is a flow diagram illustrating one embodiment of method 800 for delaying the termination of a process requesting sensitive information from a user. In one configuration, the method 800 may be implemented by the monitoring application 104.

A browser process may be monitored 802 for an execution of a message box. The execution of the message box on the browser process may be detected 804. The message box may include a message requesting configuration input from a user. A determination 806 may then be made as to whether confirmation input from the user has been detected. If it is determined 806 that confirmation input from the user has not been detected, the method 800 may return to monitor 802 the browser process for the execution of a message box. If, however, it is determined 806 that confirmation input from the user has been detected, a URL of a downloadable file may be allowed 808 to be accessed in response to the confirmation input. The URL of the downloadable file may be recorded 810, and the recorded URL of the downloadable file may be transmitted 812 to a server for analysis. In one embodiment, the browser process may be terminated 814.

Figure 9:
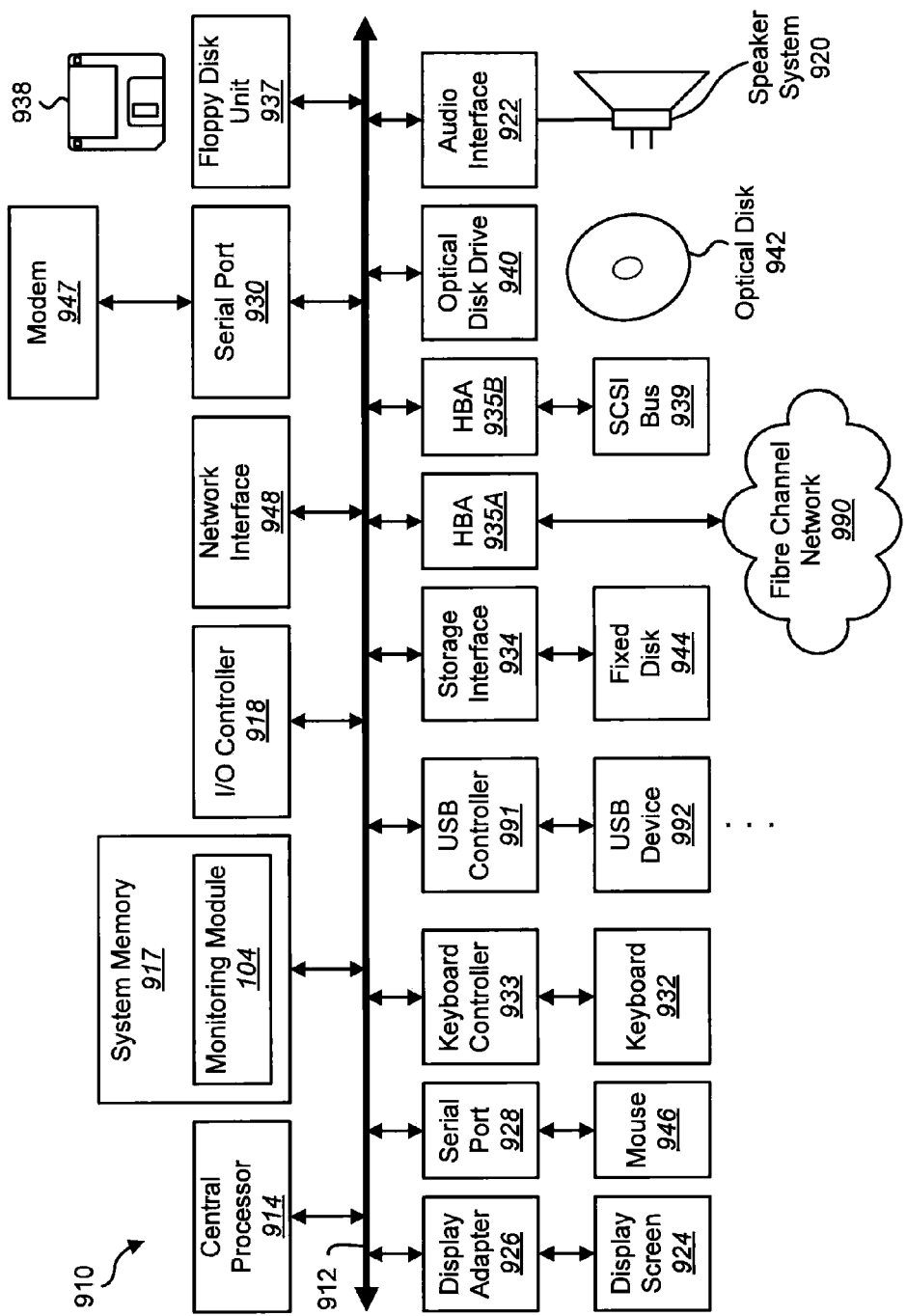
FIG. 9 depicts a block diagram of a computer system suitable for implementing the present systems and methods.

FIG. 9 depicts a block diagram of a computer system 910 suitable for implementing the present systems and methods. Computer system 910 includes a bus 912 which interconnects major subsystems of computer system 910, such as a central processor 914, a system memory 917 (typically RAM, but which may also include ROM, flash RAM, or the like), an input/output controller 918, an external audio device, such as a speaker system 920 via an audio output interface 922, an external device, such as a display screen 924 via display adapter 926, serial ports 928 and 930, a keyboard 932 (interfaced with a keyboard controller 933), multiple USB devices 992 (interfaced with a USB controller 990), a storage interface 934, a floppy disk drive 937 operative to receive a floppy disk 938, a host bus adapter (HBA) interface card 935A operative to connect with a Fibre Channel network 990, a host bus adapter (HBA) interface card 935B operative to connect to a SCSI bus 939, and an optical disk drive 940 operative to receive an optical disk 942. Also included are a mouse 946 (or other point-and-click device, coupled to bus 912 via serial port 928), a modem 947 (coupled to bus 912 via serial port 930), and a network interface 948 (coupled directly to bus 912).

Bus 912 allows data communication between central processor 914 and system memory 917, which may include read-only memory (ROM) or flash memory (neither shown), and random access memory (RAM) (not shown), as previously noted. The RAM is generally the main memory into which the operating system and application programs are loaded. The ROM or flash memory can contain, among other code, the Basic Input-Output system (BIOS) which controls basic hardware operation such as the interaction with peripheral components or devices. For example, the monitoring module 104 to implement the present systems and methods may be stored within the system memory 917. Applications resident with computer system 910 are generally stored on and accessed via a computer readable medium, such as a hard disk drive (e.g., fixed disk 844), an optical drive (e.g., optical drive 940), a floppy disk unit 937, or other storage medium. Additionally, applications can be in the form of electronic signals modulated in accordance with the application and data communication technology when accessed via network modem 947 or interface 948.

Storage interface 934, as with the other storage interfaces of computer system 910, can connect to a standard computer readable medium for storage and/or retrieval of information, such as a fixed disk drive 944. Fixed disk drive 944 may be a part of computer system 910 or may be separate and accessed through other interface systems. Modem 947 may provide a direct connection to a remote server via a telephone link or to the Internet via an internet service provider (ISP). Network interface 948 may provide a direct connection to a remote server via a direct network link to the Internet via a POP (point of presence). Network interface 948 may provide such connection using wireless techniques, including digital cellular telephone connection, Cellular Digital Packet Data (CDPD) connection, digital satellite data connection or the like.

Many other devices or subsystems (not shown) may be connected in a similar manner (e.g., document scanners, digital cameras and so on). Conversely, all of the devices shown in FIG. 9 need not be present to practice the present systems and methods. The devices and subsystems can be interconnected in different ways from that shown in FIG. 9. The operation of a computer system such as that shown in FIG. 9 is readily known in the art and is not discussed in detail in this application. Code to implement the present disclosure can be stored in computer-readable medium such as one or more of system memory 917, fixed disk 944, optical disk 942, or floppy disk 938. The operating system provided on computer system 910 may be MS-DOS®, MS-WINDOWS®, OS/2®, UNIX®, Linux®, or another known operating system.

Moreover, regarding the signals described herein, those skilled in the art will recognize that a signal can be directly transmitted from a first block to a second block, or a signal can be modified (e.g., amplified, attenuated, delayed, latched, buffered, inverted, filtered, or otherwise modified) between the blocks. Although the signals of the above described embodiment are characterized as transmitted from one block to the next, other embodiments of the present systems and methods may include modified signals in place of such directly transmitted signals as long as the informational and/or functional aspect of the signal is transmitted between blocks. To some extent, a signal input at a second block can be conceptualized as a second signal derived from a first signal output from a first block due to physical limitations of the circuitry involved (e.g., there will inevitably be some attenuation and delay). Therefore, as used herein, a second signal derived from a first signal includes the first signal or any modifications to the first signal, whether due to circuit limitations or due to passage through other circuit elements which do not change the informational and/or final functional aspect of the first signal.

Figure 10:
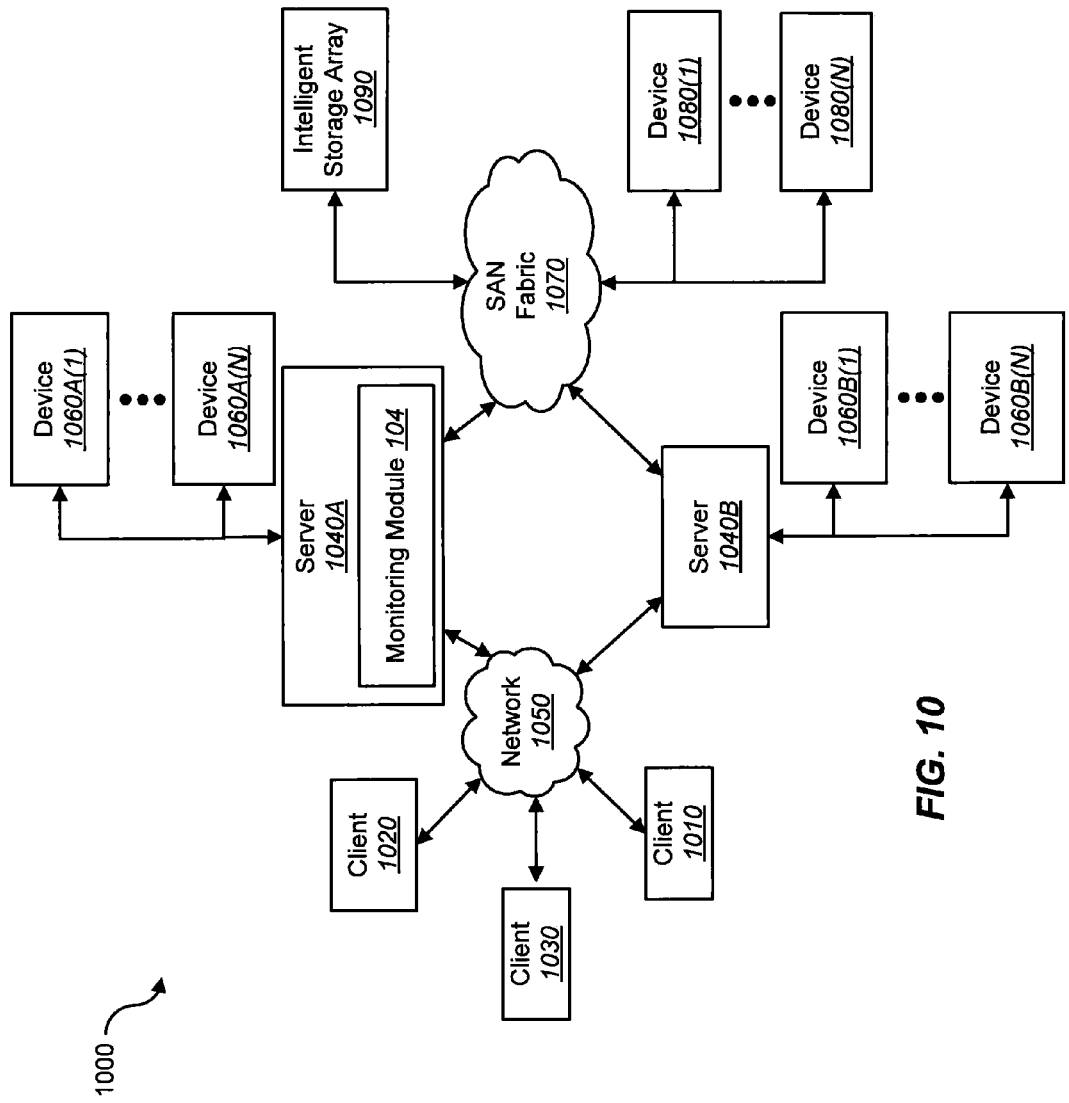
FIG. 10 is a block diagram depicting a network architecture in which client systems, as well as storage servers (any of which can be implemented using computer system), are coupled to a network.

FIG. 10 is a block diagram depicting a network architecture 1000 in which client systems 1010, 1020 and 1030, as well as storage servers 1040A and 1040B (any of which can be implemented using computer system 1010), are coupled to a network 1050. In one embodiment, the monitoring module 104 may be located within a server 1040A, 1040B to implement the present systems and methods. The storage server 1040A is further depicted as having storage devices 1060A(1)-(N) directly attached, and storage server 1040B is depicted with storage devices 1060B(1)-(N) directly attached. SAN fabric 1070 supports access to storage devices 1080(1)-(N) by storage servers 1040A and 1040B, and so by client systems 1010, 1020 and 1030 via network 1050. Intelligent storage array 1090 is also shown as an example of a specific storage device accessible via SAN fabric 1070.

With reference to computer system 910, modem 947, network interface 948 or some other method can be used to provide connectivity from each of client computer systems 1010, 1020, and 1030 to network 1050. Client systems 1010, 1020, and 1030 are able to access information on storage server 1040A or 1040B using, for example, a web browser or other client software (not shown). Such a client allows client systems 1010, 1020, and 1030 to access data hosted by storage server 1040A or 1040B or one of storage devices 1060A(1)-(N), 1060B(1)-(N), 1080(1)-(N) or intelligent storage array 1090. FIG. 10 depicts the use of a network such as the Internet for exchanging data, but the present systems and methods are not limited to the Internet or any particular network-based environment.

While the foregoing disclosure sets forth various embodiments using specific block diagrams, flowcharts, and examples, each block diagram component, flowchart step, operation, and/or component described and/or illustrated herein may be implemented, individually and/or collectively, using a wide range of hardware, software, or firmware (or any combination thereof) configurations. In addition, any disclosure of components contained within other components should be considered exemplary in nature since many other architectures can be implemented to achieve the same functionality.

The process parameters and sequence of steps described and/or illustrated herein are given by way of example only and can be varied as desired. For example, while the steps illustrated and/or described herein may be shown or discussed in a particular order, these steps do not necessarily need to be performed in the order illustrated or discussed. The various exemplary methods described and/or illustrated herein may also omit one or more of the steps described or illustrated herein or include additional steps in addition to those disclosed.

Furthermore, while various embodiments have been described and/or illustrated herein in the context of fully functional computing systems, one or more of these exemplary embodiments may be distributed as a program product in a variety of forms, regardless of the particular type of computer-readable media used to actually carry out the distribution. The embodiments disclosed herein may also be implemented using software modules that perform certain tasks. These software modules may include script, batch, or other executable files that may be stored on a computer-readable storage medium or in a computing system. In some embodiments, these software modules may configure a computing system to perform one or more of the exemplary embodiments disclosed herein.

The foregoing description, for purpose of explanation, has been described with reference to specific embodiments. However, the illustrative discussions above are not intended to be exhaustive or to limit the invention to the precise forms disclosed. Many modifications and variations are possible in view of the above teachings. The embodiments were chosen and described in order to best explain the principles of the present systems and methods and their practical applications, to thereby enable others skilled in the art to best utilize the present systems and methods and various embodiments with various modifications as may be suited to the particular use contemplated.

Unless otherwise noted, the terms "a" or "an," as used in the specification and claims, are to be construed as meaning "at least one of." In addition, for ease of use, the words "including" and "having," as used in the specification and claims, are interchangeable with and have the same meaning as the word "comprising."

What is claimed is:

1. A computer-implemented method for delaying termination of a process to capture data relating to a potential threat, comprising:
    monitoring a process that executes an event that indicates a threat;
    allowing the event to execute on the process until a predetermined indicator is triggered;
    recording data associated with the execution of the event when the predetermined indicator is triggered;
    transmitting the recorded data to a processing system for analysis; and
    terminating the process from continuing to execute the event.

2. The method of claim 1, wherein the event comprises accessing an exploit uniform resource locator (URL) that includes a download URL.

3. The method of claim 2, wherein the download URL is configured to download a file.

4. The method of claim 1, wherein the event comprises accessing a message box that comprises a message requesting confirming input from a user.

5. The method of claim 4, further comprising accessing an information requesting URL upon receiving the confirming input from the user.

6. The method of claim 5, wherein the information requesting URL is configured to download an information requesting form.

7. The method of claim 6, further comprising analyzing a pattern of data that is input to the information requesting form.

8. The method of claim 7, further comprising terminating the process from continuing to execute the event if the patter of data matches a predetermined pattern of data.

9. The method of claim 1, further comprising terminating the process when a file is downloaded.

10. The method of claim 1, further comprising terminating the process if a call to a predetermined application programming interface (API) call is executed.

11. The method of claim 1, further comprising terminating the process if a call to a predetermined API call sequence is executed.

12. A computing device configured to delay termination of a process to capture data relating to a potential threat, comprising:
    a processor;
    memory in electronic communication with the processor;
    a monitoring module configured to:
        monitor a process that executes an event that indicates a threat;
        allow the event to execute on the process until a predetermined indicator is triggered;
        record data associated with the execution of the event when the predetermined indicator is triggered;
        terminate the process from continuing to execute the event; and
    a reporting module configured to transmit the recorded data to a processing system for analysis.

13. The computing device of claim 12, wherein the event comprises accessing an exploit uniform resource locator (URL) that includes a download URL.

14. The computing device of claim 13, wherein the download URL is configured to download a file.

15. The computing device of claim 12, wherein the event comprises accessing a message box that comprises a message requesting confirming input from a user.

16. The computing device of claim 15, wherein the process is configured to access an information requesting URL upon receiving the confirming input from the user.

17. The computing device of claim 16, wherein the information requesting URL is configured to download an information requesting form.

18. The computing device of claim 17, wherein the monitoring module is further configured to analyze a pattern of data that is input to the information requesting form.

19. The computing device of claim 18, wherein the monitoring module is further configured to terminate the process from continuing to execute the event if the pattern of data matches a predetermined pattern of data.

20. A computer-program product for delaying termination of a process to capture data relating to a potential threat, the computer-program product comprising a non-transitory computer-readable medium having instructions thereon, the instructions comprising:
    code programmed to monitor a process that executes an event that indicates a threat;
    code programmed to allow the event to execute on the process until a predetermined indicator is triggered;
    code programmed to record data associated with the execution of the event when the predetermined indicator is triggered;
    code programmed to transmit the recorded data to a processing system for analysis; and
    code programmed to terminate the process from continuing to execute the event.

* * * * *